United States Patent  (10) Patent No.: US 11,717,868 B1
Yang et al.  (45) Date of Patent: Aug. 8, 2023

(54) REPAIR ADJUSTING SYSTEM FOR THERMAL-ASSISTED IN-SITU CHEMICAL OXIDATION AND ADJUSTING METHOD

(71) Applicant: GUANGDONG UNIVERSITY OF TECHNOLOGY, Guangzhou (CN)

(72) Inventors: Yan Yang, Guangzhou (CN); Haojia Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/069,941

(22) Filed: Dec. 21, 2022

(30) Foreign Application Priority Data

Feb. 28, 2022 (CN) .......................... 202210183273.9

(51) Int. Cl.
 *B09C 1/08* (2006.01)
 *G01K 1/022* (2021.01)
(52) U.S. Cl.
 CPC .............. *B09C 1/085* (2013.01); *G01K 1/022* (2013.01); *B09C 2101/00* (2013.01)
(58) Field of Classification Search
 CPC ....... B09C 1/08; B09C 1/085; B09C 2101/00; B09C 1/06; G01K 1/022
 See application file for complete search history.

(56) References Cited

U.S. PATENT DOCUMENTS

| 5,656,239 | A | * | 8/1997 | Stegemeier | ............... | E02D 3/11 422/32 |
| 10,835,938 | B1 | * | 11/2020 | Lu | ............................. | B09C 1/02 |
| 2014/0147369 | A1 | | 5/2014 | Little et al. | | |
| 2014/0246366 | A1 | * | 9/2014 | Kerfoot | .................... | C02F 1/722 210/170.07 |
| 2014/0255099 | A1 | | 9/2014 | Reynolds | | |
| 2021/0387879 | A1 | * | 12/2021 | Griffiths | ................... | C02F 1/722 |
| 2022/0241830 | A1 | * | 8/2022 | Stoin | .......................... | C02F 1/74 |

FOREIGN PATENT DOCUMENTS

| CN | 104319054 | A | 1/2015 |
| CN | 108526214 | A | 9/2018 |
| CN | 110436606 | A | 11/2019 |
| CN | 110814008 | A | 2/2020 |
| CN | 111659723 | A | 9/2020 |
| CN | 112756392 | A | 5/2021 |
| CN | 213591395 | U | 7/2021 |
| CN | 113399448 | A | 9/2021 |
| CN | 113828627 | A | 12/2021 |

* cited by examiner

*Primary Examiner* — Carib A Oquendo

(57) ABSTRACT

Disclosed are a repair adjusting system for thermal-assisted in-situ chemical oxidation and an adjusting method. The repair adjusting system for thermal-assisted in-situ chemical oxidation comprises a chemical oxidation adjusting system and a controller, the chemical oxidation adjusting system is provided with a temperature monitor, a magnetic oxidant concentration monitor, a pollutant concentration monitor and a reaction control device, the controller is respectively connected with the temperature monitor, the magnetic oxidant concentration monitor, the pollutant concentration monitor and the reaction control device, and the controller controls an oxidation process of the chemical oxidation adjusting system through the reaction control device according to output data of the temperature monitor, the magnetic oxidant concentration monitor and the pollutant concentration monitor.

8 Claims, 12 Drawing Sheets

REPAIR ADJUSTING SYSTEM FOR THERMAL-ASSISTED IN-SITU CHEMICAL OXIDATION AND ADJUSTING METHOD

CROSS REFERENCE TO RELATED APPLICATIONS

This application claims foreign priority of Chinese Patent Application No. 202210183273.9, filed on Feb. 28, 2022 in the China National Intellectual Property Administration, the disclosures of all of which are hereby incorporated by reference.

TECHNICAL FIELD

The present invention relates to the technical field of soil repair equipment, and particularly to a repair adjusting system for thermal-assisted in-situ chemical oxidation and an adjusting method.

BACKGROUND

In recent years, with the adjustment of industrial structure, a polluted site left after the relocation or shutdown of industrial enterprise has caused a great impact on an underground environment. Soil in the polluted site contains a large number of organic pollutants, such as polycyclic aromatic hydrocarbon and polychlorinated biphenyl, and these organic pollutants may also be spread through other environmental media, and are generally concealed, delayed and accumulated. Therefore, it is urgent to repair the polluted soil in the polluted site.

Soil repair is mainly divided into three categories: physical repair, biological repair and chemical repair. A chemical oxidation technology belongs to a technology of the chemical repair, which refers to adding a chemical magnetic oxidant into a polluted soil layer to oxidize and degrade large molecular organic pollutants into inorganic small molecules with less toxicity or no toxicity, thus achieving the purpose of repair. An application mode of the chemical magnetic oxidant to underground soil, an effective contact reaction between the chemical magnetic oxidant and the polluted soil, and a way of applying a certain amount of chemical magnetic oxidant are difficulties of the chemical oxidation technology. However, the polluted soil in the polluted site is heated to assist the chemical oxidation technology, which can make up for the shortcomings of the prior art and improve a repair efficiency, especially for the repair of organic pollutants difficult to volatilize and oxidize in the polluted soil underground in the industrial polluted site, thus having a remarkable repair effect.

SUMMARY

The present invention overcomes the shortcomings of the prior art, and provides a repair adjusting system for thermal-assisted in-situ chemical oxidation and an adjusting method.

A technical solution used in the present invention to achieve the objective above is: a repair adjusting system for thermal-assisted in-situ chemical oxidation, which comprises a chemical oxidation adjusting system and a controller, wherein:

the chemical oxidation adjusting system is provided with a temperature monitor, a magnetic oxidant concentration monitor, a pollutant concentration monitor and a reaction control device, the controller is respectively connected with the temperature monitor, the magnetic oxidant concentration monitor, the pollutant concentration monitor and the reaction control device, and the controller controls an oxidation process of the chemical oxidation adjusting system through the reaction control device according to output data of the temperature monitor, the magnetic oxidant concentration monitor and the pollutant concentration monitor;

the temperature monitor is mounted in a monitoring well of the chemical oxidation adjusting system, and is used for monitoring temperature information in a chemical oxidation process in real time and outputting temperature data to the controller; the magnetic oxidant concentration monitor is mounted in the monitoring well of the chemical oxidation adjusting system, and is used for monitoring magnetic oxidant concentration information in the chemical oxidation process in real time and outputting magnetic oxidant concentration data to the controller; and the pollutant concentration monitor is mounted in the monitoring well of the chemical oxidation adjusting system, and is used for monitoring a pollutant concentration in the chemical oxidation process in real time and outputting pollutant concentration data to the controller; and when the temperature data is not in a preset temperature range, the controller controls the chemical oxidation adjusting system to reduce or increase a temperature; when the magnetic oxidant concentration is lower than a preset value and the pollutant concentration is not reduced to a preset value, the controller controls a reaction device of the chemical oxidation adjusting system to suspend, and after a certain amount of magnetic oxidant is put in, the reaction device is controlled to start to continue a reaction process; and when the pollutant concentration is reduced to the preset value, the controller controls the reaction device to stop.

Further, in a preferred embodiment of the present invention, the chemical oxidation adjusting system further comprises a magnetic field generator and a magnetic oxidant injection mechanism, the reaction control device is capable of controlling the magnetic field generator and the magnetic oxidant injection mechanism to start and stop, the magnetic field generator is capable of generating a high-frequency alternating strong magnetic field, and the magnetic oxidant injection mechanism is capable of preparing a magnetic oxidant solution with a specific concentration and pressing a certain amount of magnetic oxidant solution into an injection well of the chemical oxidation adjusting system; and when the magnetic field generator is energized, the magnetic field generator generates the high-frequency alternating strong magnetic field, the magnetic oxidant in the injection well generates heat due to an eddy current effect generated, so as to directly heat a polluted soil layer, thus degrading an organic pollutant into an inorganic small molecule with less toxicity or no toxicity.

Further, in a preferred embodiment of the present invention, the reaction control device comprises a shell, a first guide plate and a second guide plate are arranged in the shell, a first switch is arranged on the first guide plate, a second switch is arranged on the second guide plate, the first switch is connected with a circuit of the magnetic field generator, the second switch is connected with a circuit of the magnetic oxidant injection mechanism, a first connecting rod, a second connecting rod, a first electromagnet, a second electromagnet and a pulling rod are also arranged in the shell, one ends of the first connecting rod and the second connecting rod are connected through a connecting block, one end of the pulling rod is fixedly connected with the connecting block, the other end of the pulling rod is fixedly connected with a pressing block, and a bottom portion of the connecting block is provided with an infrared sensor.

Further, in a preferred embodiment of the present invention, |the other end of the first connecting rod penetrates through the first guide plate and is fixedly connected with a first sliding block, the other end of the second connecting rod penetrates through the second guide plate and is fixedly connected with a second sliding block, a first spring is sleeved on the first connecting rod, one end of the first spring is fixedly connected with the first guide plate, the other end of the first spring is fixedly connected with the first sliding block, a second spring is sleeved on the second connecting rod, one end of the second spring is fixedly connected with the second guide plate, and the other end of the second spring is fixedly connected with the second sliding block.

Further, in a preferred embodiment of the present invention, the magnetic oxidant injection mechanism comprises a magnetic oxidant stirrer and a magnetic oxidant injector, a stirring mechanism and a magnetic oxidant amount control mechanism are arranged on the magnetic oxidant stirrer, the magnetic oxidant amount control mechanism comprises a storage bin and a first fixing frame, a bottom portion of the storage bin is provided with a material feeding channel, a material blocking mechanism is arranged on the material feeding channel, the material blocking mechanism comprises a first motor, a material blocking block and a connecting rod, one end of the connecting rod is fixedly connected with the material blocking block, the other end of the connecting rod is hinged on a side wall of the material feeding channel through a first hinge shaft, an output end of the first motor is connected with a first pushing rod in a matching mode, the other end of the first pushing rod is connected with a second pushing rod, and the other end of the second pushing rod is fixedly connected with the connecting rod.

Further, in a preferred embodiment of the present invention, a weighing mechanism is arranged below the material feeding channel, the weighing mechanism comprises a weighing bin and a second fixing frame, a weighing sensor is arranged on the second fixing frame, a lug is arranged on an outer side surface of the weighing bin, the weighing bin is arranged on the weighing sensor through the lug, a bottom portion of the weighing bin is provided with a material discharging mechanism, the material discharging mechanism comprises a second motor and a material discharging block, the material discharging block is hinged on the weighing bin through a second hinge shaft, an output end of the second motor is connected with a third pushing rod in a matching mode, the other end of the second pushing rod is fixedly connected with a fixed block, the fixed block is fixedly connected with a fourth pushing rod, and the other end of the fourth pushing rod is fixedly connected onto the material discharging block.

Further, in a preferred embodiment of the present invention, the stirring mechanism comprises a plurality of stirring motors, output ends of the stirring motors are all connected with a stirring shaft in a matching mode, a stirring blade is arranged on the stirring shaft, a bottom portion of the stirrer is provided with a drainage hole, an electromagnetic valve is arranged on the drainage hole, the magnetic oxidant injector comprises a nozzle, an injection tube and a pressure pump, one end of the injection tube is connected with the nozzle, and the other end of the injection tube is connected with the drainage hole.

In a second aspect, the present invention provides an adjusting method of a repair system for thermal-assisted in-situ chemical oxidation, applied in the repair adjusting system for thermal-assisted in-situ chemical oxidation according to any item, which comprises the following steps of:

acquiring region information of a site to be treated, and dividing the region information into a plurality of first sub-regions, wherein the region information comprises area information and contour information;

dividing the first sub-region into a plurality of second sub-regions in a vertical direction;

sampling and detecting the second sub-regions respectively to obtain pollution degree information of each second sub-region;

generating a first treatment report based on the pollution degree information;

acquiring three-dimensional information of the second sub-region, and generating a second treatment report according to the three-dimensional information; and combining the first treatment report with the second treatment report to treat the site to be treated.

Further, in a preferred embodiment of the present invention, the generating the first treatment report based on the pollution degree information, specifically comprises:

judging whether the pollution degree information is lower than a preset pollution degree;

when the pollution degree information is lower than the preset pollution degree, needing no oxidization treatment on the second sub-region; and when the pollution degree information is higher than the preset pollution degree, needing the oxidization treatment on the second sub-region, and generating the first treatment report according to the pollution degree information, wherein the first treatment report comprises a magnetic oxidant injection concentration, an oxidation temperature and an oxidation time.

Further, in a preferred embodiment of the present invention, the acquiring the three-dimensional information of the second sub-region, and generating the second treatment report according to the three-dimensional information, specifically comprises:

acquiring the three-dimensional information of the second sub-region, and establishing a three-dimensional model of the second sub-region based on the three-dimensional information;

acquiring first volume information of the second sub-region through the three-dimensional model;

acquiring foreign matter information in the three-dimensional model to obtain second volume information of a foreign matter, wherein the foreign matter information comprises location information and contour information of the foreign matter; and calculating a difference value between a first volume value and a second volume value, and generating the second treatment report according to the difference value, wherein the second treatment report comprises a magnetic oxidant injection amount.

The present invention discloses the repair adjusting system for thermal-assisted in-situ chemical oxidation and the adjusting method, in which an idea of efficiently utilizing a heating technology in physical repair is combined, it is conceived that the magnetic oxidant generates the eddy current effect in the alternating electromagnetic field, and heat released by the magnetic oxidant is used as a heat source to heat and then repair soil, thus improving a chemical oxidation reaction rate and increasing a reaction area between the magnetic oxidant and the organic pollutant; and a soil temperature, the magnetic oxidant concentration and the pollutant concentration in a whole reaction process are all monitored by the adjusting system, thus realizing automatic control of device and greatly saving a labor cost.

BRIEF DESCRIPTION OF THE DRAWINGS

In order to illustrate technical solutions in embodiments of the present invention or in the prior art more clearly, the drawings used in the descriptions of the embodiments or the prior art will be briefly described below. Obviously, the drawings in the following descriptions are merely some embodiments of the present invention. For those of ordinary skills in the art, other drawings may also be obtained based on these drawings without going through any creative work.

Figure 1:
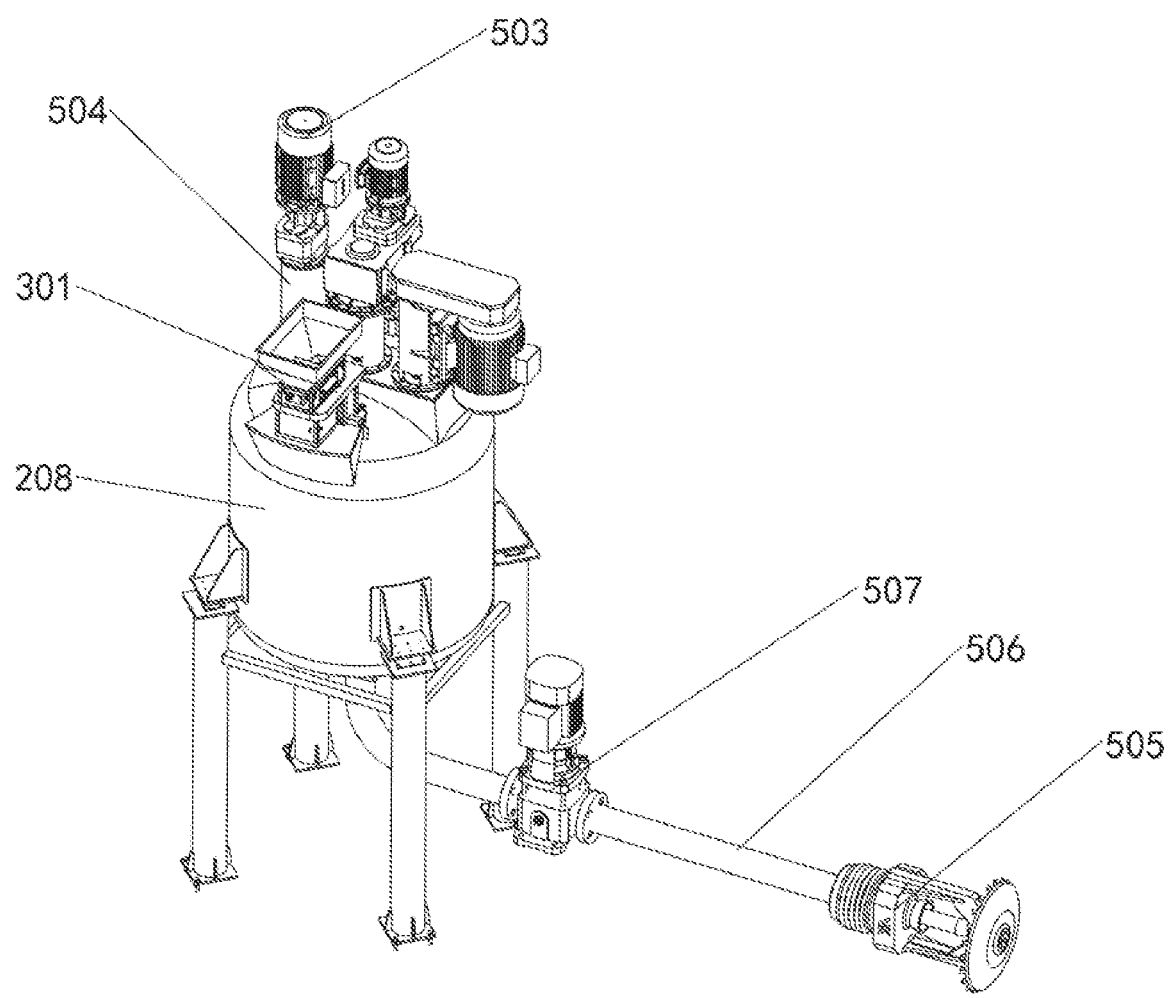
FIG. 1 is a schematic diagram of a stereoscopic structure of a magnetic oxidant injection mechanism.
Figure 2:
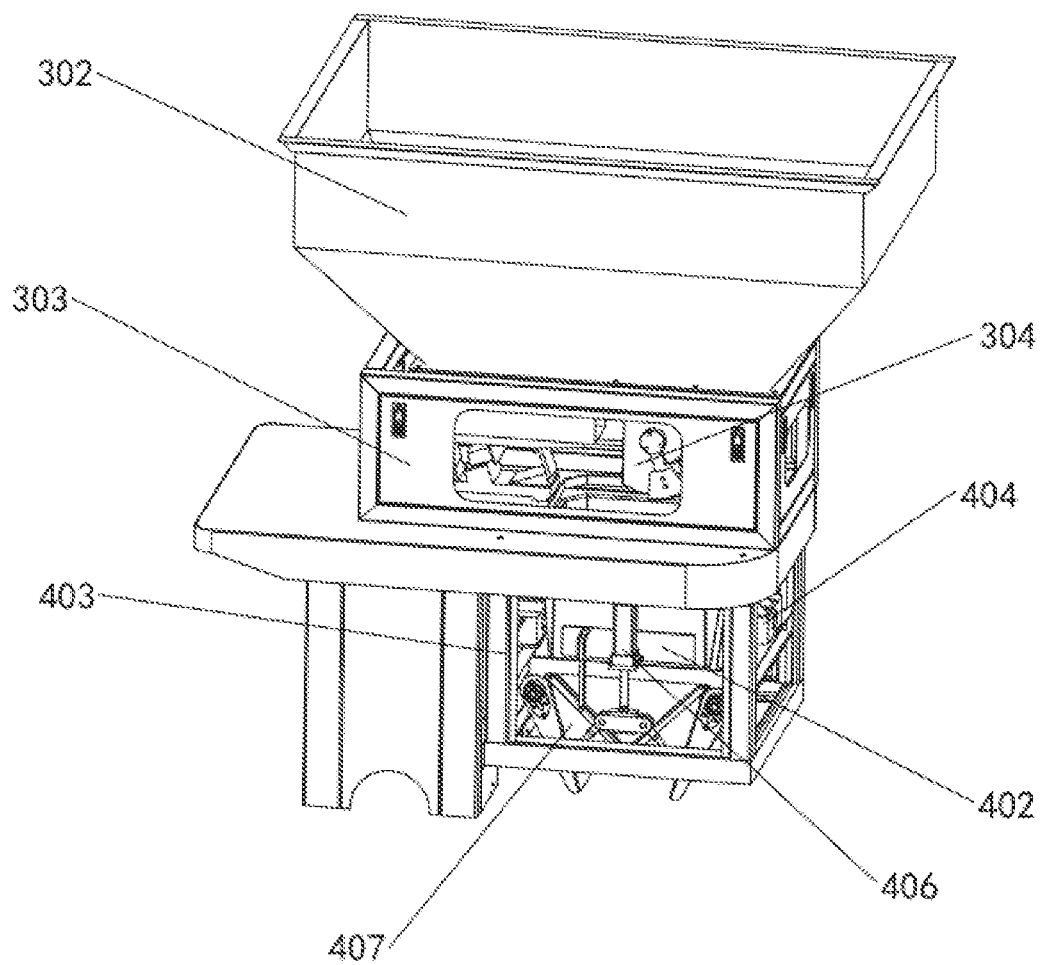
FIG. 2 is a schematic diagram of a stereoscopic structure of a magnetic oxidant amount control mechanism.
Figure 3:
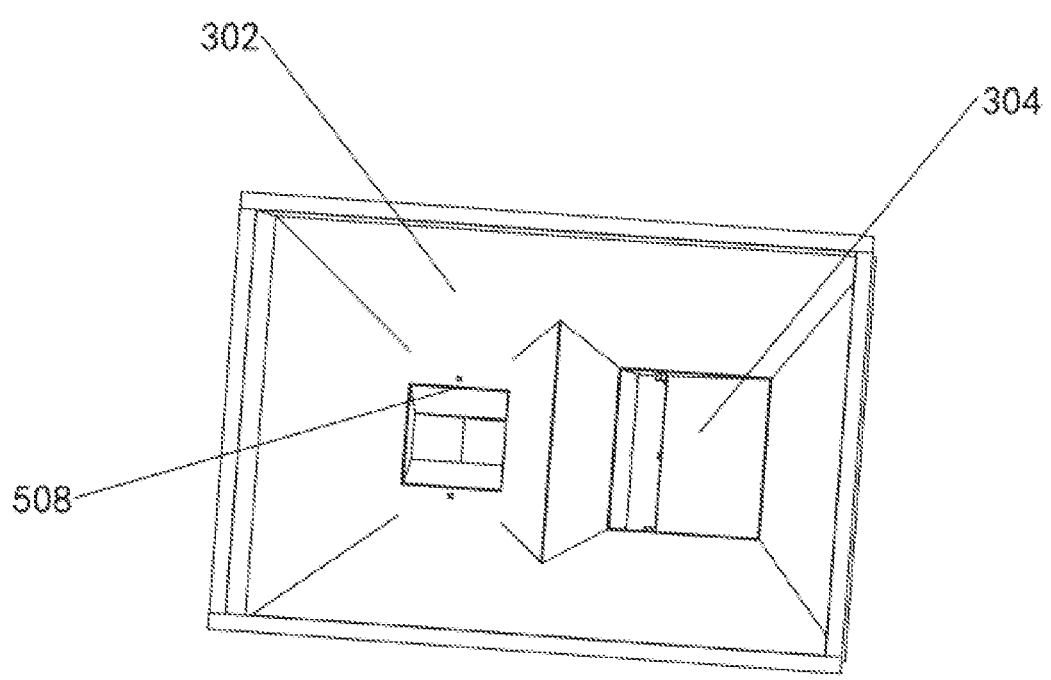
FIG. 3 is a schematic diagram of an internal structure of a storage bin.
Figure 4:
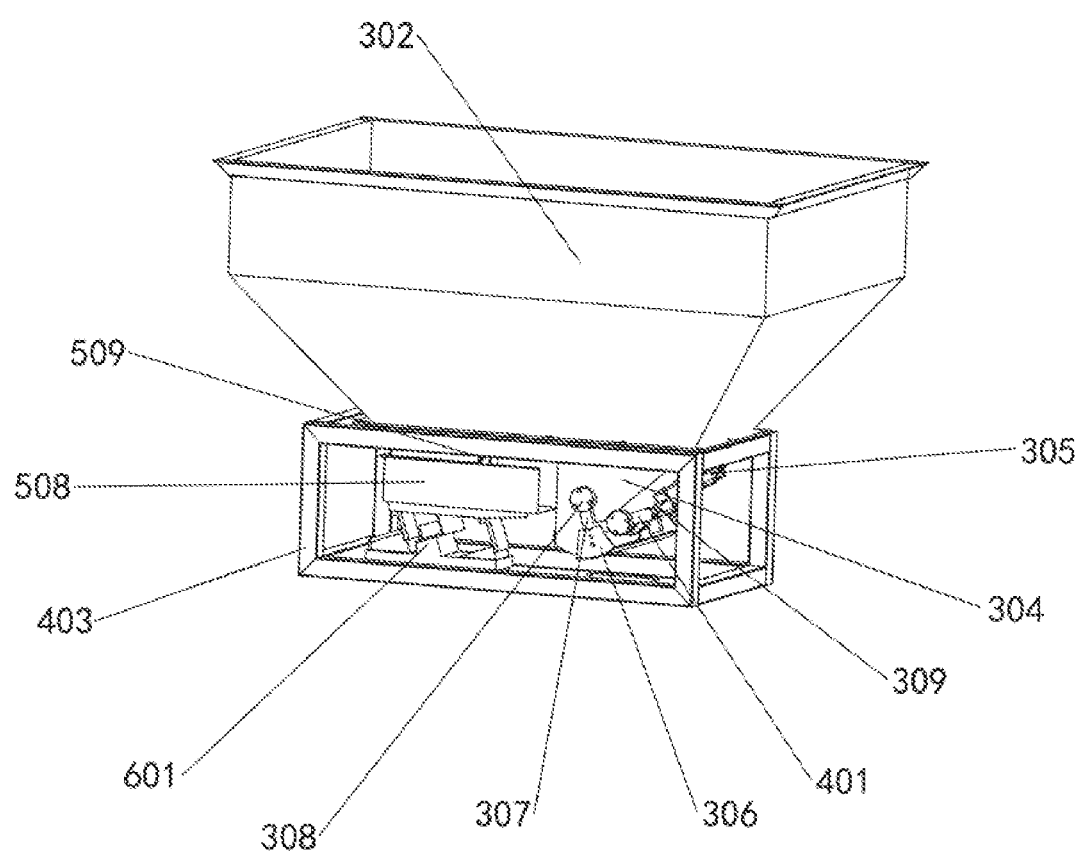
FIG. 4 is a schematic diagram of a stereoscopic structure of a material feeding channel and a material supplementing channel.
Figure 5:
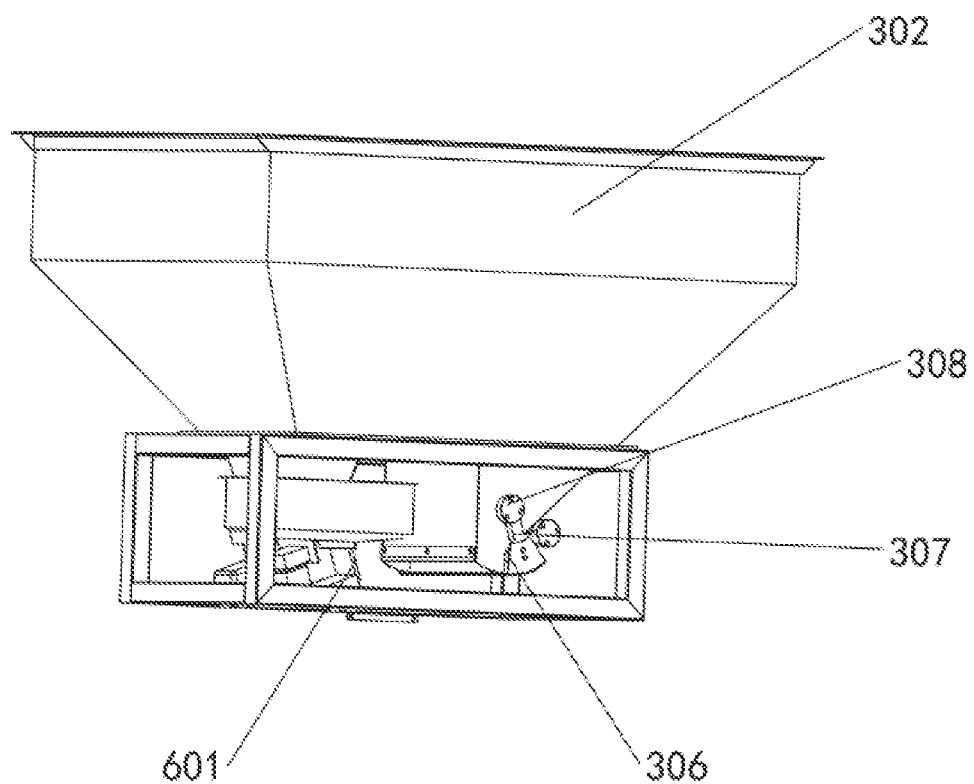
FIG. 5 is a schematic diagram of the stereoscopic structure of the material feeding channel and the material supplementing channel from another perspective.

The description of reference numerals is as follows: 101 refers to shell; 102 refers to first guide plate; 103 refers to second guide plate; 104 refers to first switch; 105 refers to second switch; 106 refers to first connecting rod; 107 refers to second connecting rod; 108 refers to first electromagnet; 109 refers to second electromagnet; 201 refers to pulling rod; 202 refers to connecting block; 203 refers to pressing block; 204 refers to first sliding block; 205 refers to second sliding block; 206 refers to first spring; 207 refers to second spring; 208 refers to magnetic oxidant stirrer; 301 refers to magnetic oxidant amount control mechanism; 302 refers to storage bin; 303 refers to first fixing frame; 304 refers to material feeding channel; 305 refers to first motor; 306 refers to material blocking block; 307 refers to connecting rod; 308 refers to first hinge shaft; 309 refers to first pushing rod; 401 refers to second pushing rod; 402 refers to weighing bin; 403 refers to second fixing frame; 404 refers to weighing sensor; 405 refers to lug; 406 refers to second motor; 407 refers to material discharging block; 408 refers to second hinge shaft; 409 refers to third pushing rod; 501 refers to fixed block; 502 refers to fourth pushing rod; 503 refers to stirring motor; 504 refers to stirring shaft; 505 refers to nozzle; 506 refers to injection tube; 507 refers to pressure pump; 508 refers to material supplementing channel; 509 refers to material blocking door; and 601 refers to vibration mechanism.

DETAILED DESCRIPTION

In order to understand the above objectives, features and advantages of the present invention more clearly, the present invention is further described in detail hereinafter with reference to the drawings and specific embodiments. These drawings are all simplified schematic diagrams, and are only intended to schematically illustrate the basic structure of the present invention, so that the drawings only show the components related to the present invention. It should be noted that the embodiments in the present application and the features in the embodiments may be combined with each other without conflict.

In a first aspect, the present invention provides a repair adjusting system for thermal-assisted in-situ chemical oxidation, which comprises a chemical oxidation adjusting system and a controller.

The chemical oxidation adjusting system is provided with a temperature monitor, a magnetic oxidant concentration monitor, a pollutant concentration monitor and a reaction control device, the controller is respectively connected with the temperature monitor, the magnetic oxidant concentration monitor, the pollutant concentration monitor and the reaction control device, and the controller controls an oxidation process of the chemical oxidation adjusting system through the reaction control device according to output data of the temperature monitor, the magnetic oxidant concentration monitor and the pollutant concentration monitor.

The temperature monitor is mounted in a monitoring well of the chemical oxidation adjusting system, and is used for monitoring temperature information in a chemical oxidation process in real time and outputting temperature data to the controller; the magnetic oxidant concentration monitor is mounted in the monitoring well of the chemical oxidation adjusting system, and is used for monitoring magnetic oxidant concentration information in the chemical oxidation process in real time and outputting magnetic oxidant concentration data to the controller; and the pollutant concentration monitor is mounted in the monitoring well of the chemical oxidation adjusting system, and is used for monitoring a pollutant concentration in the chemical oxidation process in real time and outputting pollutant concentration data to the controller.

When the temperature data is not in a preset temperature range, the controller controls the chemical oxidation adjusting system to reduce or increase a temperature; when the magnetic oxidant concentration is lower than a preset value and the pollutant concentration is not reduced to a preset value, the controller controls a reaction device of the chemical oxidation adjusting system to suspend, and after a certain amount of magnetic oxidant is put in, the reaction device is controlled to start to continue a reaction process; and when the pollutant concentration is reduced to the preset value, the controller controls the reaction device to stop.

It should be noted that an overall adjusting process of the adjusting system is that: an injection well and a monitoring well are drilled in a region to be repaired, then the certain amount of magnetic oxidant is injected into a polluted soil layer through a magnetic oxidant injection mechanism, a magnetic field generator is placed at a corresponding location in the injection well according to a depth of the polluted soil layer, and then the magnetic field generator is energized, so that the magnetic field generator generates a high-frequency alternating strong magnetic field. At the moment, the magnetic oxidant injected into soil is heated due to an eddy current effect generated, so as to directly heat the soil, thus separating and exposing an organic pollutant from the soil, and then increasing a contact area between the organic pollutant and the magnetic oxidant. Meanwhile, an oxidation property of the magnetic oxidant itself is activated due to the heating, so that a chemical oxidation reaction rate is increased, and a repair effect of the organic pollutant difficult to volatilize and oxidize is improved, thus degrading the organic pollutant in the soil into an inorganic small molecule with less toxicity or no toxicity.

It should be noted that intelligent adjustment of the adjusting system is realized through data fed back by the magnetic oxidant concentration monitor and the pollutant concentration monitor. In a continuous reaction process, when the magnetic oxidant concentration in the soil is reduced below a specified value and the pollutant concentration does not reach a safety standard, the controller automatically deenergizes the magnetic field generator to suspend the reaction, controls a magnetic oxidant injector to inject the certain amount of magnetic oxidant into the soil layer, and then starts the magnetic field generator to continue the reaction process. When the pollutant concentration reaches the safety standard, the controller may automatically deenergize the magnetic field generator, and stop feeding the magnetic oxidant, so that the reaction process is ended. In this way, in a soil adjustment and repair process, intelligent control is realized, and it is unnecessary to manually check the reaction process regularly, which greatly saves a labor force. When the pollutant concentration reaches the safety standard, the reaction process can be automatically stopped, and a reaction dosage of the magnetic oxidant can also be precisely controlled while ensuring the repair effect, thus avoiding waste of the magnetic oxidant, and saving resources.

The chemical oxidation adjusting system further comprises the magnetic field generator and the magnetic oxidant injection mechanism, the reaction control device is capable of controlling the magnetic field generator and the magnetic oxidant injection mechanism to start and stop, the magnetic field generator is capable of generating the high-frequency alternating strong magnetic field, and the magnetic oxidant injection mechanism is capable of preparing a magnetic oxidant solution with a specific concentration and pressing a certain amount of magnetic oxidant solution into the injection well of the chemical oxidation adjusting system; and when the magnetic field generator is energized, the magnetic field generator generates the high-frequency alternating strong magnetic field, the magnetic oxidant in the injection well generates heat due to the eddy current effect generated, so as to directly heat the polluted soil layer, thus degrading the organic pollutant into the inorganic small molecule with less toxicity or no toxicity.

It should be noted that a principle of soil repair of the device is that: the magnetic oxidant injected into the soil layer is in a magnetic field of the magnetic field generator, an induced electromotive force is generated due to an electromagnetic induction effect, and the magnetic oxidant itself has an electrical resistance, so that an induced current may be generated inside the magnetic oxidant. This current is in an eddy shape, and called an eddy current, the eddy current may generate different heat according to an electrical resistivity of the magnetic oxidant, and an oxidation rate of an oxidation reaction is increased with increase of temperature within a certain range. The heat generated by the eddy current may assist the chemical oxidation reaction, thus improving a soil repair effect.

Figure 8:
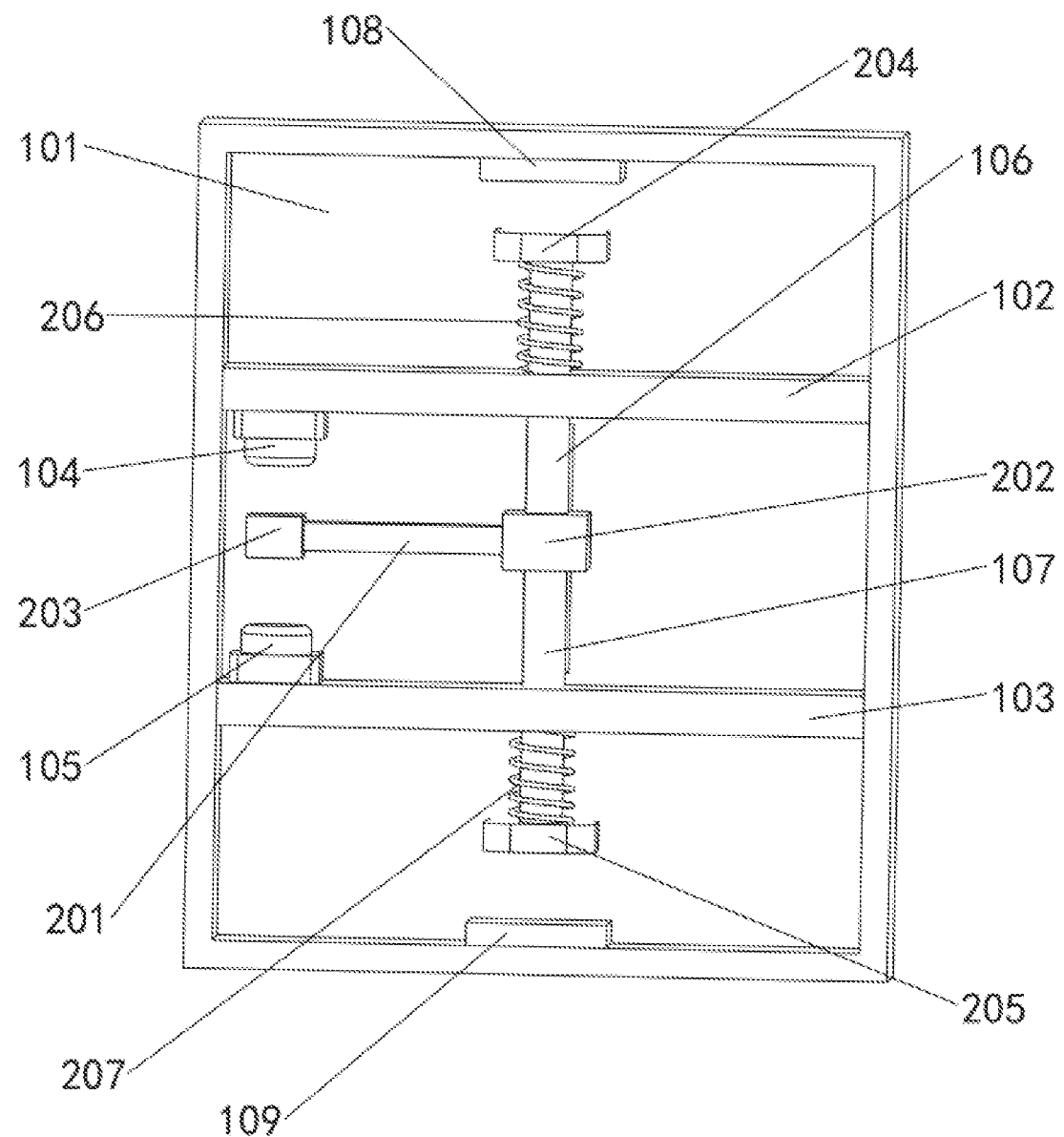
FIG. 8 is a schematic diagram of a stereoscopic structure of a reaction control device in a non-working state.
Figure 9:
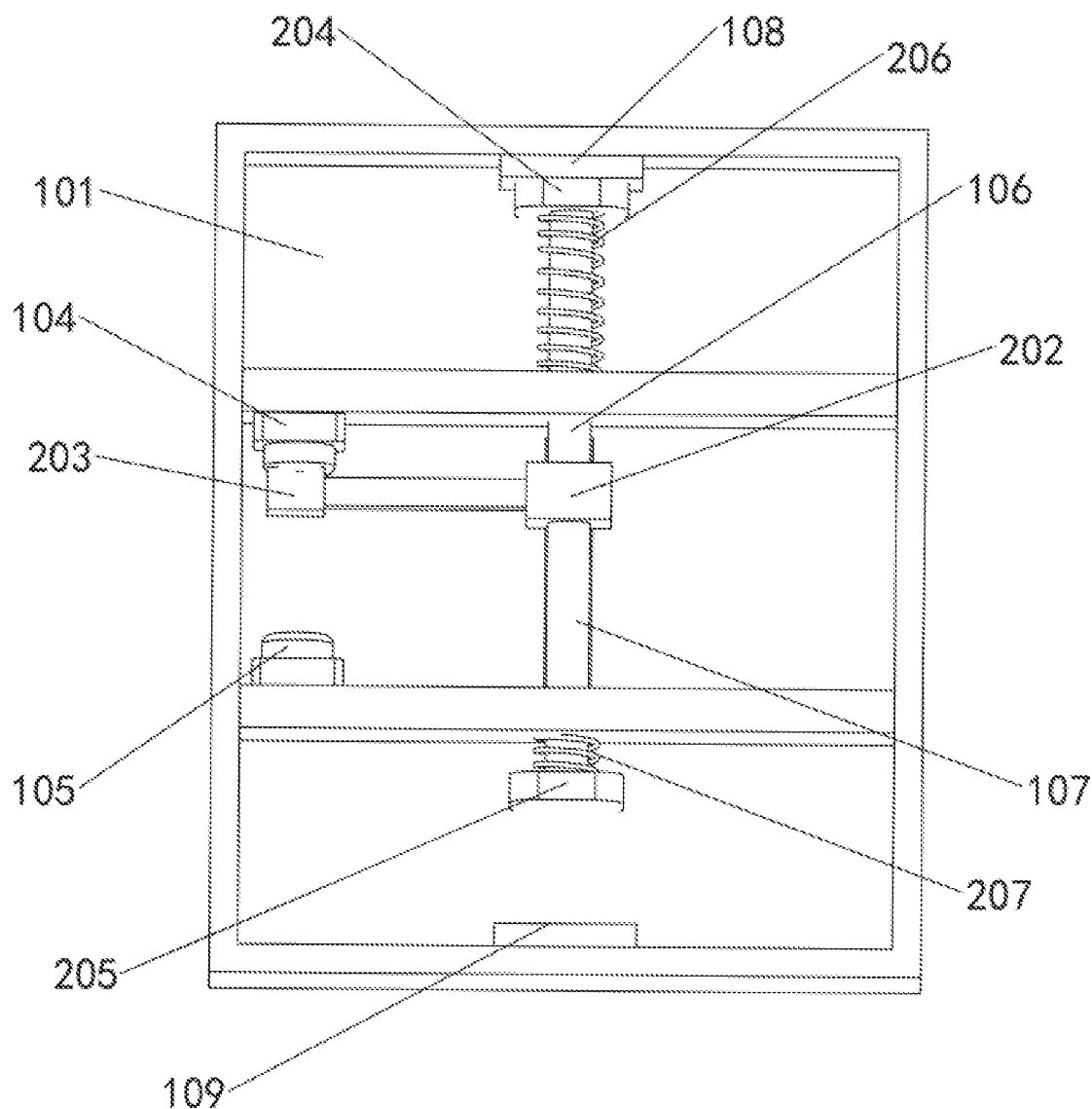
FIG. 9 is a schematic diagram of the stereoscopic structure of the reaction control device when a magnetic field generator is energized.

As shown in FIG. 8 and FIG. 9, the reaction control device comprises a shell 101, a first guide plate 102 and a second guide plate 103 are arranged in the shell 101, a first switch 104 is arranged on the first guide plate 102, a second switch 105 is arranged on the second guide plate 103, the first switch 104 is connected with a circuit of the magnetic field generator, and the second switch 105 is connected with a circuit of the magnetic oxidant injection mechanism. A first connecting rod 106, a second connecting rod 107, a first electromagnet 108, a second electromagnet 109 and a pulling rod 201 are also arranged in the shell 101, one ends of the first connecting rod 106 and the second connecting rod 107 are connected through a connecting block 202, one end of the pulling rod 201 is fixedly connected with the connecting block 202, the other end of the pulling rod is fixedly connected with a pressing block 203, and a bottom portion of the connecting block 202 is provided with an infrared sensor.

The other end of the first connecting rod 106 penetrates through the first guide plate 102 and is fixedly connected with a first sliding block 204, and the other end of the second connecting rod 107 penetrates through the second guide plate 103 and is fixedly connected with a second sliding block 205. A first spring 206 is sleeved on the first connecting rod 106, one end of the first spring 206 is fixedly connected with the first guide plate 102, and the other end of the first spring is fixedly connected with the first sliding block 204. A second spring 207 is sleeved on the second connecting rod 107, one end of the second spring 207 is fixedly connected with the second guide plate 103, and the other end of the second spring is fixedly connected with the second sliding block 205.

It should be noted that, in an oxidation reaction process, when the magnetic oxidant concentration in the soil layer is lower than the preset value and the pollutant concentration is not reduced to the preset value, the reaction control device can disconnect the circuit of the magnetic field generator to suspend the oxidation reaction, then connect the circuit of the magnetic oxidant injection mechanism to inject the certain amount of magnetic oxidant into the soil layer through the magnetic oxidant injection mechanism, and then connect the circuit of the magnetic field generator again to continue the reaction process. When the pollutant concentration is reduced to the preset value, the reaction control device is controlled to disconnect the circuits of the magnetic field generator and the magnetic oxidant injection mechanism to finish adjustment and repair of the soil layer.

The reaction control device is controlled in a way that: when the magnetic field generator needs to be energized, the first electromagnet 108 on the reaction control device is energized and the second electromagnet 109 on the reaction control device is deenergized, and the first electromagnet 108 is magnetic after being energized, so that the first sliding block 204 is adsorbed to the first electromagnet 108, and then the pressing block 203 slides to the first switch 104 and presses the first switch 104, thus connecting the circuit of the magnetic field generator, and then making the magnetic field generator work (at the moment, the magnetic oxidant injection mechanism is in a non-working state). When the pressure pump 507 on the magnetic oxidant injection mechanism needs to be energized, the second electromagnet 109 on the reaction control device is energized and the first electromagnet 108 on the reaction control device is deenergized, and the second electromagnet 109 is magnetic after being energized, so that the second sliding block 205 is adsorbed to the second electromagnet 109, and then the pressing block 203 slides to the second switch 105 and presses the second switch 105, thus energizing the pressure pump 507, and then injecting the magnetic oxidant into the soil by the magnetic oxidant injection mechanism (at the moment, the magnetic field generator is in a non-working state). When the soil adjustment and repair are completed, the first electromagnet 108 and the second electromagnet 109 on the reaction control device are deenergized, the first electromagnet 108 and the second electromagnet 109 are non-magnetic, and under resilience actions of the first spring 206 and the second spring 207, the first sliding block 204 and the second sliding block 205 are both reset, so that the pressing block 203 is also reset and located in a middle portion of the shell 101, and at the moment, the circuits of the magnetic field generator and the magnetic oxidant injection mechanism are both disconnected to stop the oxidation reaction. In this way, according to information of the magnetic oxidant concentration and an organic matter concentration, the reaction control device can automatically control the whole oxidation reaction process, which greatly saves a labor cost, is easy to control, and has a simple structure, a low cost and a strong practicability, and the reaction control device can ensure that the second switch 105 is not triggered when the first switch 104 is triggered (or the first switch 104 is not triggered when the second switch 105 is triggered) to guarantee that the magnetic field generator and the magnetic oxidant injection mechanism work alternatively and independently, which can avoid a situation that the magnetic oxidant in the nozzle 505, the injection tube 506 and the pressure pump 507 burns out equipment due to the electromagnetic induction effect of the magnetic field generator when the magnetic oxidant is injected, thus further ensuring a safety of equipment.

It should be noted that the bottom portion of the connecting block 202 is provided with the infrared sensor, and whether a fault occurs inside the reaction control device may be detected through the infrared sensor. For example, after the first electromagnet 108 or the second electromagnet 109 is energized, location information of the connecting block 202 is detected through infrared sensing, and when the connecting block 202 is not located at a preset location, it is indicated that the first electromagnet 108 or the second electromagnet 109 has been non-magnetic at the moment. For example, after the first electromagnet 108 and the second electromagnet 109 are deenergized, the location information of the connecting block 202 is detected through the infrared sensor, and when the connecting block 202 is not located at the middle portion of the shell 101, it is indicated that the first spring 206 or the second spring 207 has lost the resilience force at the moment. When the above fault occurs, the controller can generate a fault report and send the fault report to a remote user terminal, and a user can maintain the device according to the fault report, thus saving a time for the user to check and analyze the fault of the device, saving a labor time, and improving a labor efficiency. In addition, the first guide plate 102 also has a guiding function, and when the first electromagnet 108 absorbs the first sliding block 204, or the first spring 206 rebounds and resets, the first guide plate 102 can avoid location offset of the first sliding block 204, thus improving a stability and a reliability of the device during operation.

As shown in FIG. 1 to FIG. 5, the magnetic oxidant injection mechanism comprises a magnetic oxidant stirrer 208 and a magnetic oxidant injector, and a stirring mechanism and a magnetic oxidant amount control mechanism 301 are arranged on the magnetic oxidant stirrer 208. The magnetic oxidant amount control mechanism 301 comprises a storage bin 302 and a first fixing frame 303, a bottom portion of the storage bin 302 is provided with a material feeding channel 304, and a material blocking mechanism is arranged on the material feeding channel 304. The material blocking mechanism comprises a first motor 305, a material blocking block 306 and a connecting rod 307, one end of the connecting rod 307 is fixedly connected with the material blocking block 306, the other end of the connecting rod is hinged on a side wall of the material feeding channel 304 through a first hinge shaft 308, an output end of the first motor 305 is connected with a first pushing rod 309 in a matching mode, the other end of the first pushing rod 309 is connected with a second pushing rod 401, and the other end of the second pushing rod 401 is fixedly connected with the connecting rod 307.

Figure 6:
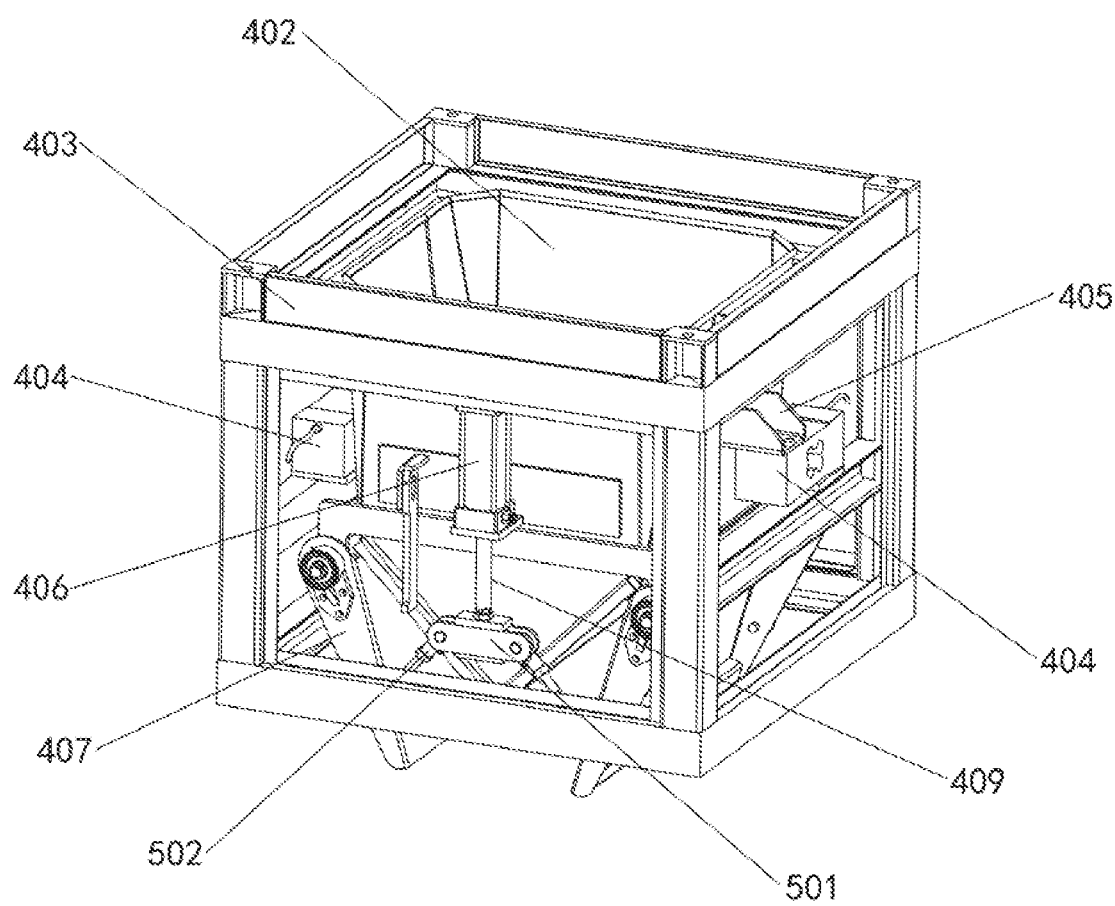
FIG. 6 is a schematic diagram of a stereoscopic structure of a weighing mechanism.
Figure 7:
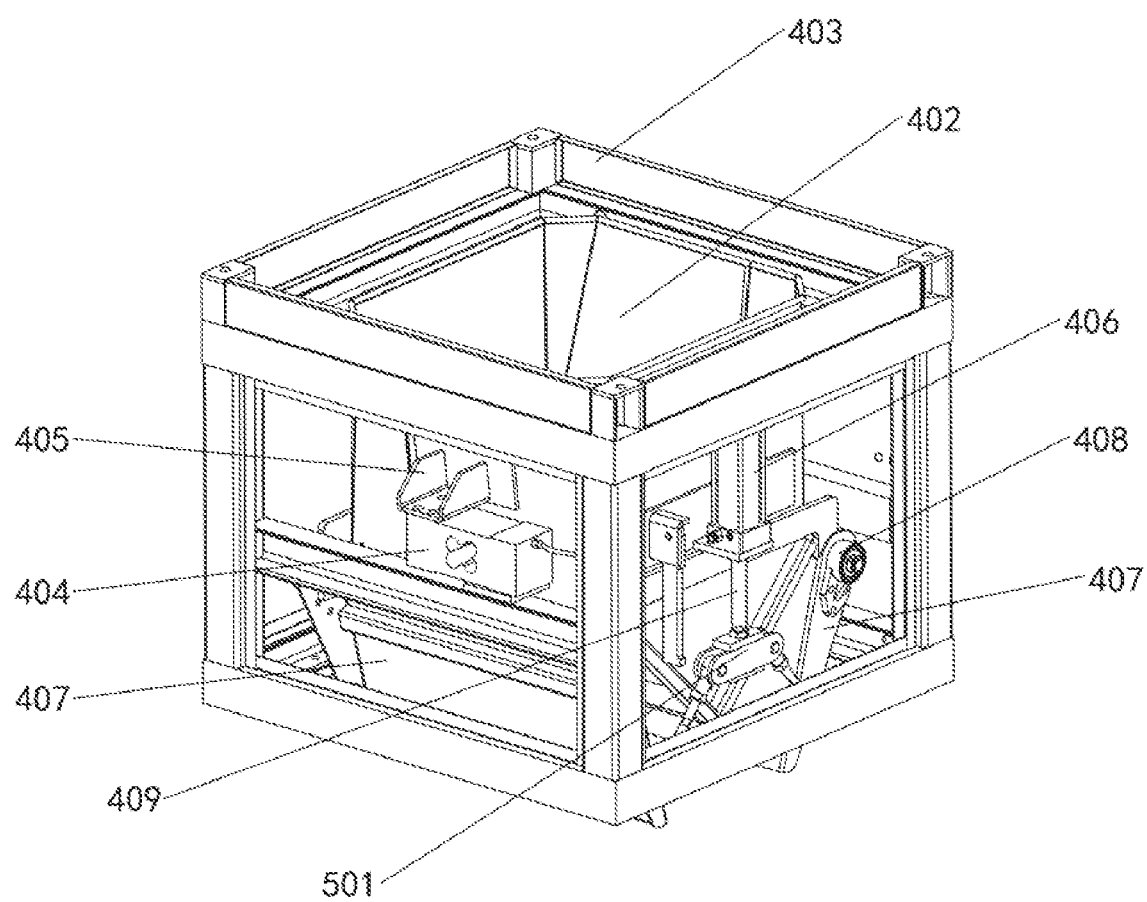
FIG. 7 is a schematic diagram of the stereoscopic structure of the weighing mechanism from another perspective.

As shown in FIG. 6 and FIG. 7, a weighing mechanism is arranged below the material feeding channel 304, the weighing mechanism comprises a weighing bin 402 and a second fixing frame 403, a weighing sensor 404 is arranged on the second fixing frame 403, a lug 405 is arranged on an outer side surface of the weighing bin 402, the weighing bin 402 is arranged on the weighing sensor 404 through the lug 405, and a bottom portion of the weighing bin 402 is provided with a material discharging mechanism. The material discharging mechanism comprises a second motor 406 and a material discharging block 407, the material discharging block 407 is hinged on the weighing bin 402 through a second hinge shaft 408, an output end of the second motor 406 is connected with a third pushing rod 409 in a matching mode, the other end of the second pushing rod 401 is fixedly connected with a fixed block 501, the fixed block 501 is fixedly connected with a fourth pushing rod 502, and the other end of the fourth pushing rod 502 is fixedly connected onto the material discharging block 407.

The stirring mechanism comprises a plurality of stirring motors 503, output ends of the stirring motors 503 are all connected with a stirring shaft 504 in a matching mode, a stirring blade is arranged on the stirring shaft 504, a bottom portion of the stirrer is provided with a drainage hole, and an electromagnetic valve is arranged on the drainage hole. The magnetic oxidant injector comprises a nozzle 505, an injection tube 506 and a pressure pump 507, one end of the injection tube 506 is connected with the nozzle 505, and the other end of the injection tube is connected with the drainage hole.

It should be noted that the bottom portion of the storage bin 302 is also provided with a material supplementing channel 508, a material blocking door 509 is arranged on the material supplementing channel 508, the material blocking door 509 is arranged on the material supplementing channel 508 slidably up and down, and a bottom portion of the material supplementing channel 508 is provided with a vibration mechanism 601.

It should be noted that the magnetic oxidant stirrer 208 is capable of automatically preparing the magnetic oxidant solution with the specific concentration, so that the magnetic oxidant injector is capable of injecting the magnetic oxidant solution into the soil layer. Magnetic oxidant injection concentration information is obtained through a first treatment report, so that a dosage of the magnetic oxidant and an amount of water required for preparing the magnetic oxidant solution are obtained, and the water is pumped into the magnetic oxidant stirrer 208 by a water pump. It is a conventional technical means to pump the water into the magnetic oxidant stirrer 208, which will not be described herein. Then, the certain amount of magnetic oxidant is put into the magnetic oxidant stirrer 208 through the magnetic oxidant amount control mechanism 301, and then the magnetic oxidant and the water are mixed and stirred, so as to prepare the magnetic oxidant solution with the specific concentration.

A specific working process of the magnetic oxidant amount control mechanism 301 is that: large-flow feeding is carried out through the material feeding channel 304 first, and the first motor 305 is driven, so that the first motor 305 drives the first pushing rod 309 to retract, then the first pushing rod 309 drives the second pushing rod 401 to retract, then the second pushing rod 401 drives the connecting block 202 to rotate, and then the connecting block 202 drives the material blocking block 306 to rotate, thus making the material blocking block 306 no longer block the material feeding channel 304, and then enabling the magnetic oxidant to flow into the weighing bin 402 along the material feeding channel 304. When a weight value of the magnetic oxidant in the weighing bin 402 differs from a preset weight value by a certain value, the first motor 305 is driven, so that the first motor 305 pushes out the first pushing rod 309, and then the material blocking block 306 blocks the material feeding channel 304, thus making the magnetic oxidant no longer flow out of the material feeding channel 304. Then, material supplementation is carried out through the material supplementing channel 508, and the vibration mechanism 601 is started, so that a vibration motor in the vibration mechanism 601 vibrates, so as to drive the material supplementing channel 508 to vibrate up and down, when the material supplementing channel 508 vibrates up and down, the material blocking door 509 vibrates up and down together, so that the magnetic oxidant is capable of being slowly and dispersedly vibrated into the weighing bin 402, and when a weight value of the magnetic oxidant in the weighing bin 402 reaches a preset weight value, the vibration mechanism 601 stops vibrating, so that a precise material feeding process is finished. Then, the second motor 406 is driven, so that the second motor 406 drives the third pushing rod 409 to be pushed out, then the third pushing rod 409 pushes the fourth pushing rod 502, and then the fourth pushing rod 502 pushes the material discharging block 407, thus expanding the material discharging block 407, and then putting the magnetic oxidant in the weighing bin 402 into the magnetic oxidant stirrer 208. Then, the stirring motor 503 is started, so that the stirring motor 503 drives the stirring shaft 504 to rotate, and then the stirring blade is rotated, thus fully stirring and mixing the water and the magnetic oxidant to form the magnetic oxidant solution, and then finishing a preparation process of the magnetic oxidant with the specific concentration. When the preparation of the magnetic oxidant solution is finished, the electromagnetic valve on the drainage hole is turned on, the pressure pump 507 is started at the same time, and the magnetic oxidant solution is injected into the soil layer through the nozzle 505. In this way, the large-flow material feeding is carried out through the material feeding channel 304, and then the precise material supplementation is carried out through the material supplementing channel 508, so that a specific dosage of magnetic oxidant is capable of being dragged into the magnetic oxidant stirrer 208, and then the magnetic oxidant solution with the specific concentration is injected into the soil layer, thus realizing precise control, having good adjustment and repair effects, saving resources, and avoiding excessive use of the magnetic oxidant.

It should be noted that, firstly, the vibration motor in the vibration mechanism 601 is in communication connection with the weighing sensor 404, and in a material supplementing process of the material supplementing channel 508, the weight value of the magnetic oxidant in the weighing bin 402 is measured in real time through the weighing sensor 404, so as to determine a vibration amplitude of the vibration motor. When the weight value of the magnetic oxidant in the weighing bin 402 is closer to the preset weight value, the vibration amplitude of the vibration motor is smaller, so that the material supplementation is finished more precisely, thus avoiding excessive input of the magnetic oxidant. Secondly, two lugs 405 are provided for the weighing bin 402, the lugs 405 of the weighing bin 402 are respectively arranged on a top portion of the weighing sensor 404, and rest parts of the weighing bin 402 are all in an overhead state, so that when the magnetic oxidant is put into the weighing bin 402, a weight of the magnetic oxidant is accurately measured through the weighing sensor 404. In addition, the material blocking block 306 is set to be arc-shaped, and when the material blocking block 306 blocks the material feeding channel 304, a good transition surface is arranged in the arc-shaped material blocking block 306, so that the material blocking block 306 will not squeeze the magnetic oxidant in a closing process, thus avoiding the magnetic oxidant from being squeezed to be invalid, and ensuring a use effect of the magnetic oxidant.

Figure 10:
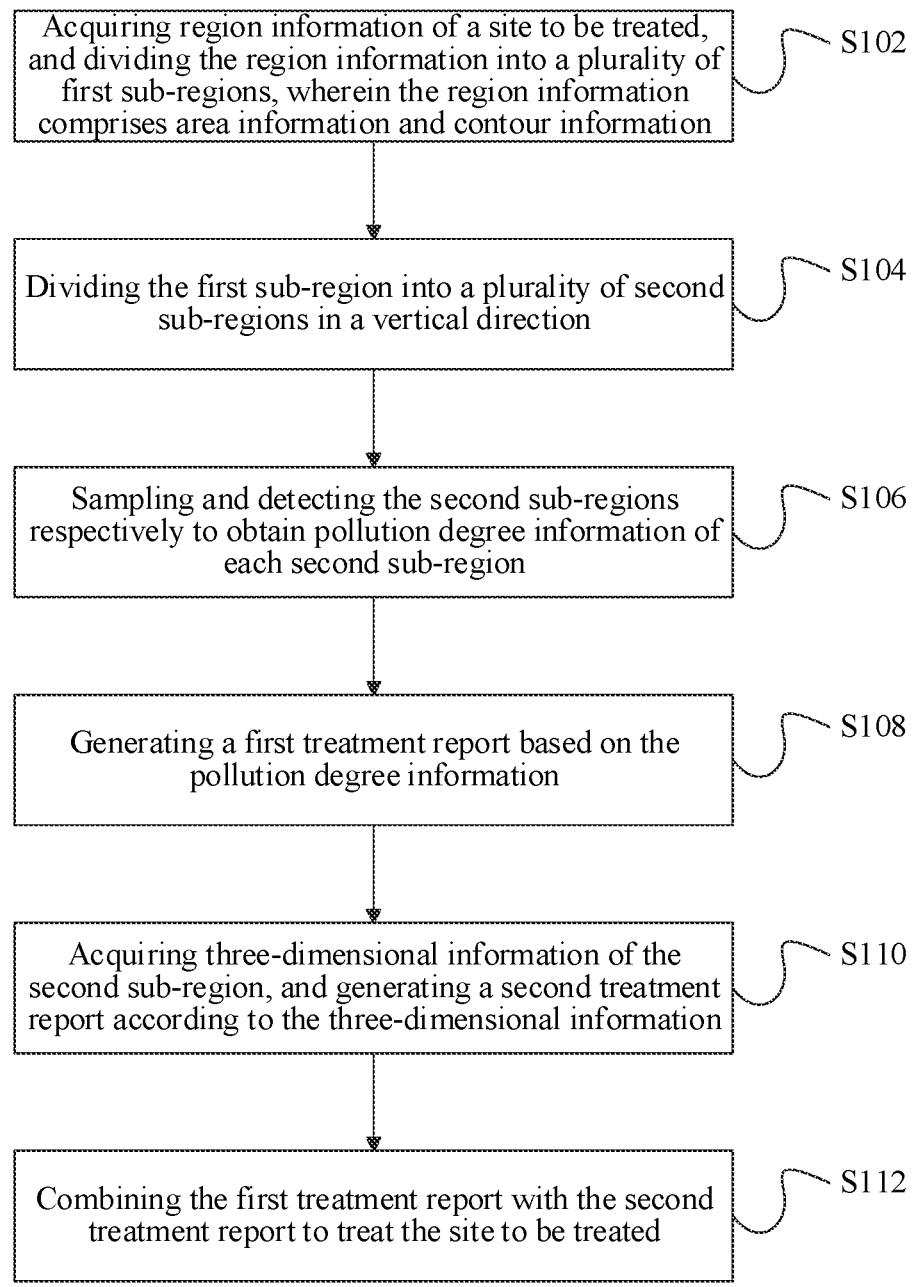
FIG. 10 is a flow chart of a first adjusting method of a repair system for oxidation.

In a second aspect, the present invention provides an adjusting method of a repair system for thermal-assisted in-situ chemical oxidation, applied in the repair adjusting system for thermal-assisted in-situ chemical oxidation according to any item, which, as shown in FIG. 10, comprises the following steps of:

S102: acquiring region information of a site to be treated, and dividing the region information into a plurality of first sub-regions, wherein the region information comprises area information and contour information;

S104: dividing the first sub-region into a plurality of second sub-regions in a vertical direction;

S106: sampling and detecting the second sub-regions respectively to obtain pollution degree information of each second sub-region;

S108: generating a first treatment report based on the pollution degree information;

S110: acquiring three-dimensional information of the second sub-region, and generating a second treatment report according to the three-dimensional information; and S112: combining the first treatment report with the second treatment report to treat the site to be treated.

Figure 11:
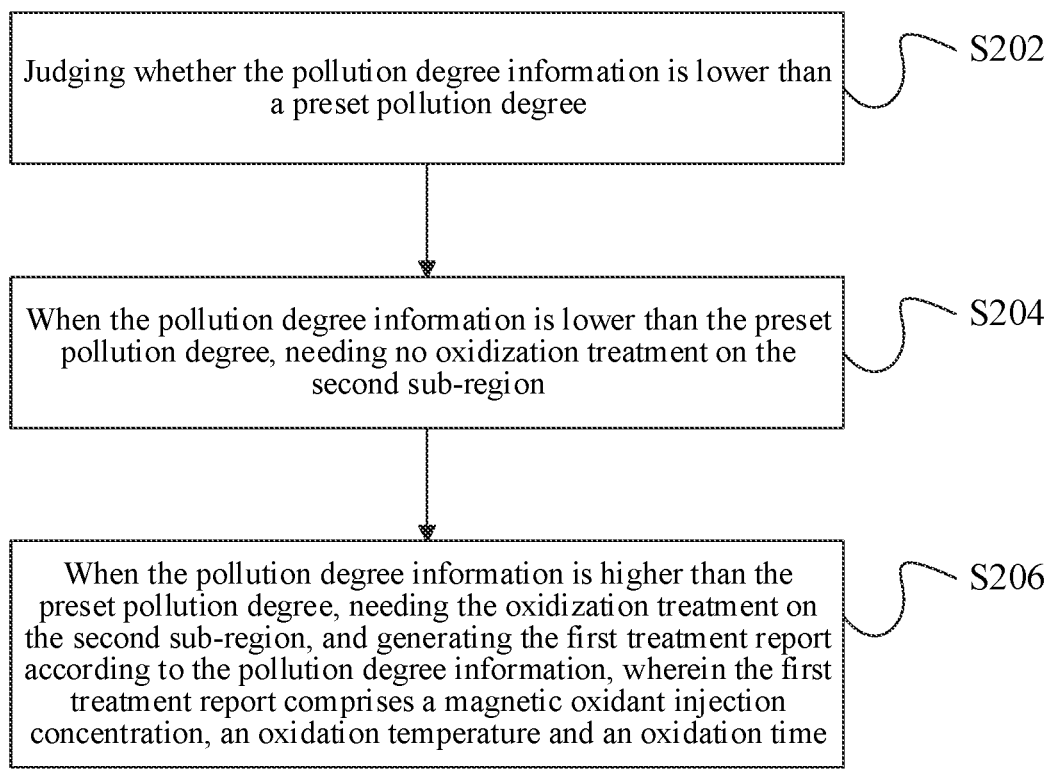
FIG. 11 is a flow chart of a second adjusting method of the repair system for oxidation.

The generating the first treatment report based on the pollution degree information, as shown in FIG. 11, specifically comprises:

S202: judging whether the pollution degree information is lower than a preset pollution degree;

S204: when the pollution degree information is lower than the preset pollution degree, needing no oxidization treatment on the second sub-region; and S206: when the pollution degree information is higher than the preset pollution degree, needing the oxidization treatment on the second sub-region, and generating the first treatment report according to the pollution degree information, wherein the first treatment report comprises a magnetic oxidant injection concentration, an oxidation temperature and an oxidation time.

Figure 12:
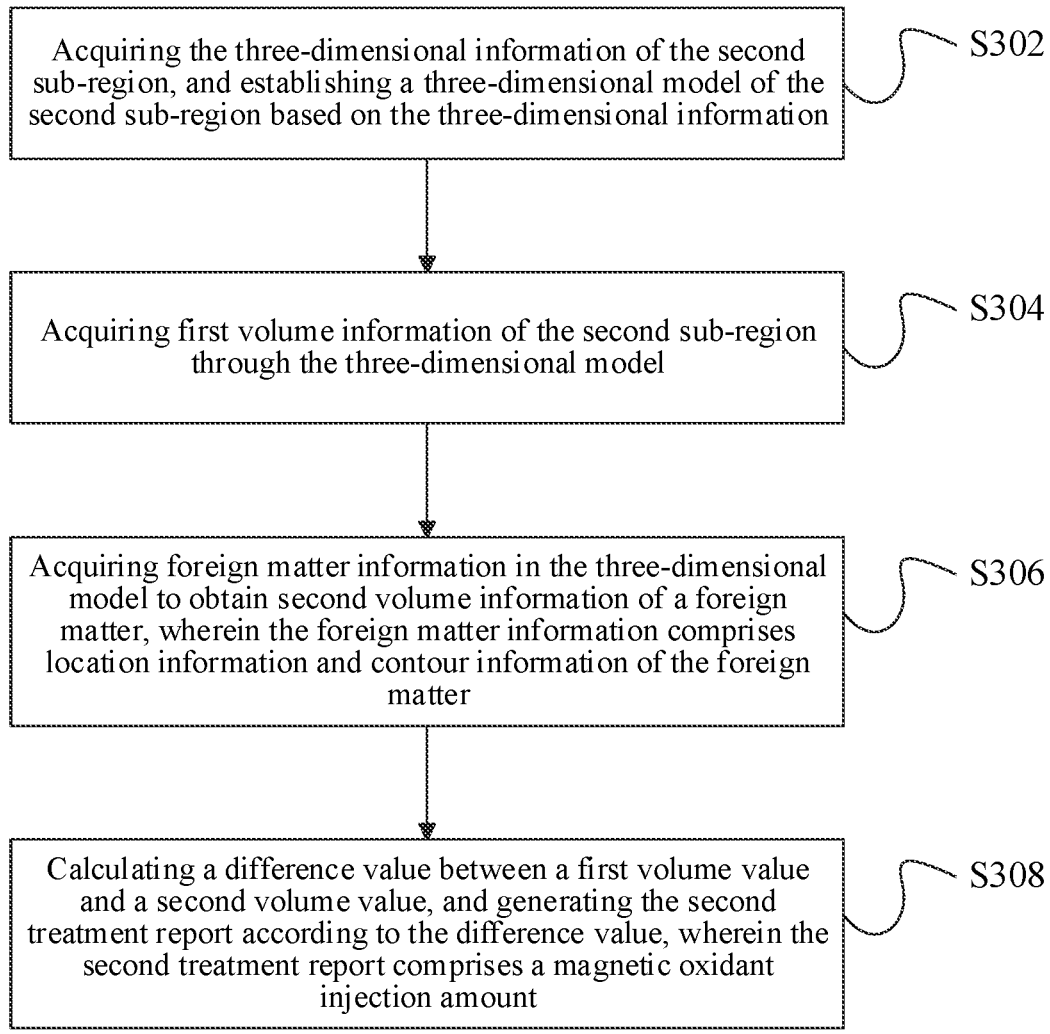
FIG. 12 is a flow chart of a third path adjusting method of the repair system for oxidation.

The acquiring the three-dimensional information of the second sub-region, and generating the second treatment report according to the three-dimensional information, as shown in FIG. 12, specifically comprises:

S302: acquiring the three-dimensional information of the second sub-region, and establishing a three-dimensional model of the second sub-region based on the three-dimensional information;

S304: acquiring first volume information of the second sub-region through the three-dimensional model;

S306: acquiring foreign matter information in the three-dimensional model to obtain second volume information of a foreign matter, wherein the foreign matter information comprises location information and contour information of the foreign matter; and S308: calculating a difference value between a first volume value and a second volume value, and generating the second treatment report according to the difference value, wherein the second treatment report comprises a magnetic oxidant injection amount.

It should be noted that image information of the site to be treated may be acquired through a vision system (a remote sensing technology and an unmanned aerial vehicle photographing technology), and then a contour and an area of the site are calculated through the image information, so that the site to be treated is divided into the plurality of first sub-regions with the same area in a horizontal direction according to contour and area information. After the first sub-region is determined, the first sub-region is divided into the plurality of second sub-regions in the vertical direction, then soil in each second sub-region may be sampled and detected through an automatic sampling device, and an organic pollutant concentration in the soil in each second sub-region is analyzed, so that the pollution degree in the soil in each second sub-region is determined, and then whether the soil in the second sub-region needs to be subjected to oxidation adjustment and repair is judged according to the pollution degree. When the pollution degree is within a safety standard, the second sub-region does not need to be subjected to oxidation repair, location information of the second sub-region is recorded, and the location is marked as a site that does not need to be treated. When the pollution degree is higher than the safety standard, in the case of needing to repair the second sub-region, the location information of the second sub-region is recorded, and the location is marked as the site to be treated. Moreover, a processor generates the first treatment report according to the pollution degree of the second sub-region, and stores information of the first treatment report into a storage, wherein the first treatment report comprises a magnetic oxidant injection concentration, an oxidation temperature and an oxidation time for repairing the second sub-region.

It should be noted that the first volume value is a total volume of a certain second sub-region; and the second volume value is an ineffective volume in the second sub-region, and the invalid volume is a total volume of the foreign matter. The difference value between the first volume value and the second volume value is an effective volume, and the effective volume is a total volume of the soil in the second sub-region. After the effective volume is calculated, a required magnetic oxidant injection amount can be calculated according to the effective volume. Due to large foreign matters such as a stone and an iron block in the soil layer in the site to be repaired, when the soil is subjected to oxidation repair, these foreign matters such as the stone and the iron block belong to ineffective objects, and do not need to be subjected to oxidation repair. Therefore, when the dosage of the magnetic oxidant solution to be injected for soil repair is calculated, it is necessary to subtract a volume occupied by these ineffective objects, so that the magnetic oxidant injection amount can be further determined, and then precise injection of the magnetic oxidant is realized, thus avoiding excessive injection of the magnetic oxidant, avoiding waste of the magnetic oxidant, and saving resources. In the present application, an ultrasonic wave emitted by each second sub-region may be detected by an ultrasonic detector, so that a shape and a location of the foreign matter in the second sub-region are detected, and then second volume information of the foreign matter in the second sub-region is calculated according to shape information of the foreign matter. Then, the difference value between the first volume value and the second volume value (which is namely the ineffective volume) is calculated, and then a magnetic oxidant solution injection amount for repairing the second sub-region is calculated in combination with a permeability of the magnetic oxidant solution in the soil layer according to the ineffective volume.

After the magnetic oxidant injection concentration, the magnetic oxidant solution injection amount, the oxidation temperature and the oxidation time required for repairing each second sub-region are determined, the controller controls the magnetic oxidant stirrer 208 to prepare the magnetic oxidant solution with the specific concentration, then controls the magnetic oxidant injection mechanism to inject the certain amount of magnetic oxidant into the soil layer in each second sub-region, then controls the oxidation temperature by controlling the magnetic field generator to start and controlling a magnitude of an alternating current of the magnetic field generator, and controls an energizing time of the magnetic field generator so as to control the oxidation time, thus intelligently finishing a chemical oxidation repair process.

It should be noted that the adjusting method of the repair system for thermal-assisted in-situ chemical oxidation further comprises the following steps of:

acquiring temperature data of a region to be repaired in real time;

comparing the temperature data with first preset temperature data and second preset temperature data;

when the temperature data is lower than the first preset temperature data, adjusting the magnetic field generator according to a first adjustment parameter;

when the temperature data is higher than the second preset temperature data, adjusting the magnetic field generator according to a second adjustment parameter; and when the temperature data is in a range of the first preset temperature data and the second preset temperature data, needing no adjustment to the magnetic field generator;

wherein the first adjustment parameter is an adjustment parameter of increasing the current first and then stabilizing the current, and the second adjustment parameter is an adjustment parameter of decreasing the current first and then stabilizing the current.

It should be noted that, in an oxidation reaction process, a temperature has an important influence on an oxidation efficiency of the magnetic oxidant, and in a certain temperature range, the oxidation efficiency of the magnetic oxidant is improved with the increase of the temperature. However, when the temperature is higher than a certain temperature value, the higher the temperature is, the lower the oxidation efficiency of the magnetic oxidant is. Meanwhile, when the temperature is lower than a certain temperature, the lower the temperature is, the lower the oxidation efficiency of the magnetic oxidant is. In the reaction process, when the current of the magnetic field generator is not changed all the time, the temperature can be kept within an appropriate reaction temperature range at an initial stage of the reaction, but a temperature in the soil layer can be slowly increased (because the temperature is a cumulative process) with the increase of the reaction time. When the temperature is higher than a certain value, the oxidation efficiency of the magnetic oxidant can be reduced, thus having an adverse influence on a reaction efficiency and a reaction effect. In order to solve this technical problem, the present invention monitors the temperature in the reaction process in real time through the temperature monitor. When the temperature is higher than the second preset temperature data, the controller can reduce the current generated by the magnetic field, so that a magnetic field strength is reduced, thus reducing the temperature to the appropriate range. When the temperature is lower than the first preset temperature data, the controller can increase the current generated by the magnetic field, so that the magnetic field strength is increased, thus increasing the temperature to the appropriate range. In this way, the reaction temperature can be controlled by intelligently adjusting the current, so that the reaction temperature is always kept in the appropriate temperature range, thus ensuring the oxidation efficiency of the magnetic oxidant, reducing a time of soil repair, and improving a labor efficiency.

Ideal embodiments of the present invention are taken as inspirations above, and the descriptions of the embodiments are specific and detailed, but the embodiments cannot be understood as limiting the scope of invention patent. It should be noted that those of ordinary skills in the art may make a plurality of transformations and improvements without departing from the conception of the present invention, and these transformations and improvements should all fall within the scope of protection of the present invention. Therefore, the scope of protection of the invention patent should be subjected to the claims appended.

The invention claimed is:

1. A repair adjusting system for thermal-assisted in-situ chemical oxidation, comprising a chemical oxidation adjusting system and a controller, wherein:

the chemical oxidation adjusting system is provided with a temperature monitor, a magnetic oxidant concentration monitor, a pollutant concentration monitor and a reaction control device, the controller is respectively connected with the temperature monitor, the magnetic oxidant concentration monitor, the pollutant concentration monitor and the reaction control device, and the controller controls an oxidation process of the chemical oxidation adjusting system through the reaction control device according to output data of the temperature monitor, the magnetic oxidant concentration monitor and the pollutant concentration monitor;

the temperature monitor is mounted in a monitoring well of the chemical oxidation adjusting system, and is used for monitoring temperature information in a chemical oxidation process in real time and outputting temperature data to the controller; the magnetic oxidant concentration monitor is mounted in the monitoring well of the chemical oxidation adjusting system, and is used for monitoring magnetic oxidant concentration information in the chemical oxidation process in real time and outputting magnetic oxidant concentration data to the controller; and the pollutant concentration monitor is mounted in the monitoring well of the chemical oxidation adjusting system, and is used for monitoring a pollutant concentration in the chemical oxidation process in real time and outputting pollutant concentration data to the controller;

when the temperature data is not in a preset temperature range, the controller controls the chemical oxidation adjusting system to reduce or increase a temperature; when the magnetic oxidant concentration is lower than a preset value and the pollutant concentration is not reduced to a preset value, the controller controls a reaction device of the chemical oxidation adjusting system to suspend, and after a certain amount of magnetic oxidant is put in, the reaction device is controlled to start to continue a reaction process; and when the pollutant concentration is reduced to the preset value, the controller controls the reaction device to stop;

the chemical oxidation adjusting system further comprises a magnetic field generator and a magnetic oxidant injection mechanism, the reaction control device is capable of controlling the magnetic field generator and the magnetic oxidant injection mechanism to start and stop, the magnetic field generator is capable of generating a high-frequency alternating strong magnetic field, and the magnetic oxidant injection mechanism is capable of preparing a magnetic oxidant solution with a specific concentration and pressing a certain amount of magnetic oxidant solution into an injection well of the chemical oxidation adjusting system; and when the magnetic field generator is energized, the magnetic field generator generates the high-frequency alternating strong magnetic field, the magnetic oxidant in the injection well generates heat due to an eddy current effect generated, so as to directly heat a polluted soil layer, thus degrading an organic pollutant into an inorganic small molecule with less toxicity or no toxicity; and the reaction control device comprises a shell, a first guide plate and a second guide plate are arranged in the shell, a first switch is arranged on the first guide plate, a second switch is arranged on the second guide plate, the first switch is connected with a circuit of the magnetic field generator, the second switch is connected with a circuit of the magnetic oxidant injection mechanism, a first connecting rod, a second connecting rod, a first electromagnet, a second electromagnet and a pulling rod are also arranged in the shell, one ends of the first connecting rod and the second connecting rod are connected through a connecting block, one end of the pulling rod is fixedly connected with the connecting block, the other end of the pulling rod is fixedly connected with a pressing block, and a bottom portion of the connecting block is provided with an infrared sensor.

2. The repair adjusting system for thermal-assisted in-situ chemical oxidation according to claim 1, wherein the other end of the first connecting rod penetrates through the first guide plate and is fixedly connected with a first sliding block, the other end of the second connecting rod penetrates through the second guide plate and is fixedly connected with a second sliding block, a first spring is sleeved on the first connecting rod, one end of the first spring is fixedly connected with the first guide plate, the other end of the first spring is fixedly connected with the first sliding block, a second spring is sleeved on the second connecting rod, one end of the second spring is fixedly connected with the second guide plate, and the other end of the second spring is fixedly connected with the second sliding block.

3. The repair adjusting system for thermal-assisted in-situ chemical oxidation according to claim 1, wherein the magnetic oxidant injection mechanism comprises a magnetic oxidant stirrer and a magnetic oxidant injector, a stirring mechanism and a magnetic oxidant amount control mechanism are arranged on the magnetic oxidant stirrer, the magnetic oxidant amount control mechanism comprises a storage bin and a first fixing frame, a bottom portion of the storage bin is provided with a material feeding channel, a material blocking mechanism is arranged on the material feeding channel, the material blocking mechanism comprises a first motor, a material blocking block and a connecting rod, one end of the connecting rod is fixedly connected with the material blocking block, the other end of the connecting rod is hinged on a side wall of the material feeding channel through a first hinge shaft, an output end of the first motor is connected with a first pushing rod in a matching mode, the other end of the first pushing rod is connected with a second pushing rod, and the other end of the second pushing rod is fixedly connected with the connecting rod.

4. The repair adjusting system for thermal-assisted in-situ chemical oxidation according to claim 3, wherein a weighing mechanism is arranged below the material feeding channel, the weighing mechanism comprises a weighing bin and a second fixing frame, a weighing sensor is arranged on the second fixing frame, a lug is arranged on an outer side surface of the weighing bin, the weighing bin is arranged on the weighing sensor through the lug, a bottom portion of the weighing bin is provided with a material discharging mechanism, the material discharging mechanism comprises a second motor and a material discharging block, the material discharging block is hinged on the weighing bin through a second hinge shaft, an output end of the second motor is connected with a third pushing rod in a matching mode, the other end of the second pushing rod is fixedly connected with a fixed block, the fixed block is fixedly connected with a fourth pushing rod, and the other end of the fourth pushing rod is fixedly connected onto the material discharging block.

5. The repair adjusting system for thermal-assisted in-situ chemical oxidation according to claim 3, wherein the stirring mechanism comprises a plurality of stirring motors, output ends of the stirring motors are all connected with a stirring shaft in a matching mode, a stirring blade is arranged on the stirring shaft, a bottom portion of the stirrer is provided with a drainage hole, an electromagnetic valve is arranged on the drainage hole, the magnetic oxidant injector comprises a nozzle, an injection tube and a pressure pump, one end of the injection tube is connected with the nozzle, and the other end of the injection tube is connected with the drainage hole.

6. An adjusting method of a repair system for thermal-assisted in-situ chemical oxidation, applied in the repair adjusting system for thermal-assisted in-situ chemical oxidation according to claim 1, comprising the following steps of:
acquiring region information of a site to be treated, and dividing the region information into a plurality of first sub-regions, wherein the region information comprises area information and contour information;
dividing the first sub-region into a plurality of second sub-regions in a vertical direction;
sampling and detecting the second sub-regions respectively to obtain pollution degree information of each second sub-region;
generating a first treatment report based on the pollution degree information;
acquiring three-dimensional information of the second sub-region, and generating a second treatment report according to the three-dimensional information; and
combining the first treatment report with the second treatment report to treat the site to be treated.

7. The adjusting method of the repair system for thermal-assisted in-situ chemical oxidation according to claim 6, wherein the generating the first treatment report based on the pollution degree information, specifically comprises:
judging whether the pollution degree information is lower than a preset pollution degree;
when the pollution degree information is lower than the preset pollution degree, needing no oxidization treatment on the second sub-region; and
when the pollution degree information is higher than the preset pollution degree, needing the oxidization treatment on the second sub-region, and generating the first treatment report according to the pollution degree information, wherein the first treatment report comprises a magnetic oxidant injection concentration, an oxidation temperature and an oxidation time.

8. The adjusting method of the repair system for thermal-assisted in-situ chemical oxidation according to claim 6, wherein the acquiring the three-dimensional information of the second sub-region, and generating the second treatment report according to the three-dimensional information, specifically comprises:
acquiring the three-dimensional information of the second sub-region, and establishing a three-dimensional model of the second sub-region based on the three-dimensional information;
acquiring first volume information of the second sub-region through the three-dimensional model;
acquiring foreign matter information in the three-dimensional model to obtain second volume information of a foreign matter, wherein the foreign matter information comprises location information and contour information of the foreign matter; and
calculating a difference value between a first volume value and a second volume value, and generating the second treatment report according to the difference value, wherein the second treatment report comprises a magnetic oxidant injection amount.

* * * * *